F. E. MODLIN.
GAS PURIFIER.
APPLICATION FILED DEC. 28, 1917.
1,316,330.
Patented Sept. 16, 1919.
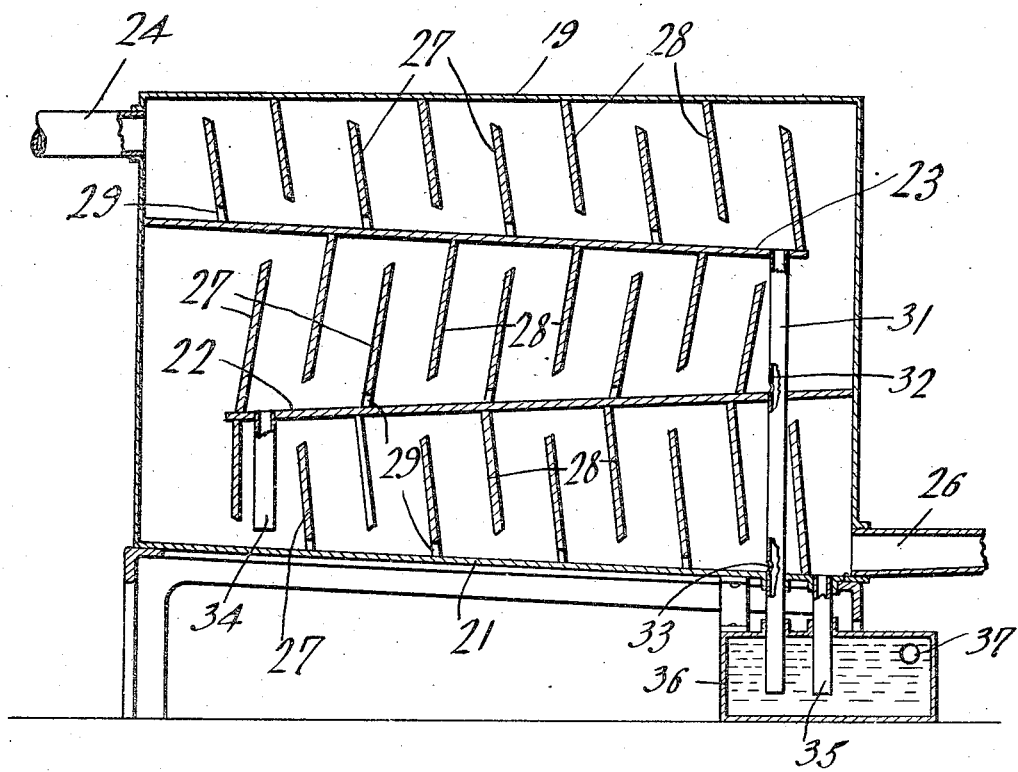
F. E. Modlin
Inventor

UNITED STATES PATENT OFFICE.

FRANK E. MODLIN, OF FORT WORTH, TEXAS, ASSIGNOR TO P. E. MILLER, OF TARRANT COUNTY, TEXAS.

GAS-PURIFIER.

1,316,330.　　　　Specification of Letters Patent.　　Patented Sept. 16, 1919.

Application filed December 28, 1917. Serial No. 209,334.

*To all whom it may concern:*

Be it known that I, FRANK E. MODLIN, a citizen of the United States, residing at Fort Worth, in the county of Tarrant and State of Texas, have invented a new and useful Gas-Purifier, of which the following is a specification.

The present invention relates to separators for use in connection with gas generators, one of its objects being to provide apparatus of this character which is simple in construction and operation, efficient, and will thoroughly remove impurities from the gas supplied thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the accompanying drawing, which shows the preferred form of the invention, the separator has been shown in vertical section.

The separator includes a casing 19 and vertically spaced reversely inclined partitions 21, 22 and 23 extending from the opposite ends of the casing and having their upper ends connected thereto and their lower ends spaced from the opposite ends. The lowermost partition 21 preferably provides the bottom of the casing, and the pipe 24 is connected to one end of the casing to admit the gas thereinto above the upper end of the uppermost partition 23, while the gas outlet pipe 26 is connected to the opposite end of the casing above the lower end of the lowermost partition 21.

Each of the partitions 21, 22 and 23 are provided with upstanding baffles 27, and depending baffles 28 are hung rigidly from the partitions 22 and 23 and the top of the casing between the baffles 27 to provide for a zigzagged flow of the air in each of the longitudinal passages formed by the partitions. The baffles 27 of each set, with the exception of the baffle at the lower end of the respective partition, are provided with lower drain apertures 29 for the flow of the tar and other impurities down the partition past said baffles. A vertical drain pipe 31 has its upper end connected to the lower portion of the partition 23 for the discharge of impurities flowing down the partition 23 and stopped by the baffle 27 at the lower end of said partition. The drain pipe 31 extends downwardly through the partition 22 near the upper end thereof and also extends downwardly through the lower portion of the partition or bottom 21. The pipe 31 has an aperture 32 immediately above the partition 22 for the downward flow of liquids arrested by the baffle 27 at the upper end of the partition 22, and said pipe is further provided with a drain aperture 33 immediately above the lower portion of the partition 21 for the downward flow of the liquid stopped by the baffle 27 at the lower end of the partition 21. A depending drain pipe 34 is connected to the partition 22 near the lower end for the downward flow of liquid stopped by the baffle 27 at the lower end of said partition. A drain pipe 35 is also connected to the lower portion of the partition 21 at that side of the corresponding baffle opposite to the drain pipe 31, for the downward flow of liquids where the gas passes out of the separator. The drain pipes 31 and 35 depend within a liquid seal vessel or trap 36 having the overflow opening or pipe 37 through which the liquid within the trap overflows, said trap sealing the drain pipes and preventing the escape of gas therethrough.

The gas in entering the separator from the pipe 24 must move through a zig-zagged course past the upper set of baffles 27 and 28 above the partition 23 and thence passes downwardly under said partition to move through a zig-zagged course between the partitions 22 and 23. From the lower end of the partition 22, the gas passes downwardly underneath said partition and again moves through a zig-zagged course between the partitions 21 and 22 to the outlet pipe 26. The impurities such as tar and other by products, in striking the baffles will be arrested thereby and will drop on or run down the baffles onto the inclined partitions, flowing through the apertures 29 to the lower ends of the partitions. The impurities which flow to the lower ends of the partitions 21 and 23 can pass down through the drain pipe 31, and the impurities can also flow downwardly through the said drain pipe from the upper portion of the partition 22. The impurities are conducted from the lower portion of the partition 22 through the drain pipe 34 to the upper portion of the partition 21. The passages formed by the partitions not only extend back and forth, but the baffles within said passages provide for the zig-zag flow of the gas within each passage, thereby providing a compact and effective arrangement.

Having thus described the invention, what is claimed as new is:—

In a gas separator a casing having a gas inlet at the top of one end and a gas outlet at the bottom of its other end, the bottom of the casing being inclined downwardly toward the outlet end, upstanding baffles provided with drain openings through the lower ends thereof and integral with the bottom of the casing, an imperforate baffle upon said bottom and close to the gas outlet, a trap below the casing, a drain pipe opening into the trap from the space between the imperforate baffle and the gas outlet, upper and lower oppositely inclined partitions within the casing, upwardly and downwardly extending baffles upon the partitions, downwardly extending baffles upon the top of the casing, the downwardly extending baffles on the top of the casing and on the partitions extending into the spaces between the upwardly extending baffles upon the partitions and the bottom of the casing, all of the upwardly extending baffles except those at the lower ends of the partitions and one at the upper end of the lower partition being provided with drain openings therethrough at their lower ends, a drain pipe for receiving material trapped at the lower end of the lower partition and discharging it onto the upper end of the bottom of the casing.

In testimony that I claim the foregoing as my own, I have hereto affixed my signature in the presence of two witnesses.

FRANK E. MODLIN.

Witnesses:
P. E. MILLER,
GEO. E. MILLER.